Jan. 21, 1969  L. D. CRAWFORD  3,422,954

SORTING SYSTEM FOR FOOD ARTICLES

Filed Feb. 11, 1966  Sheet 1 of 6

INVENTOR.
LYNN D. CRAWFORD

BY *Allen and Chromy*

ATTORNEYS

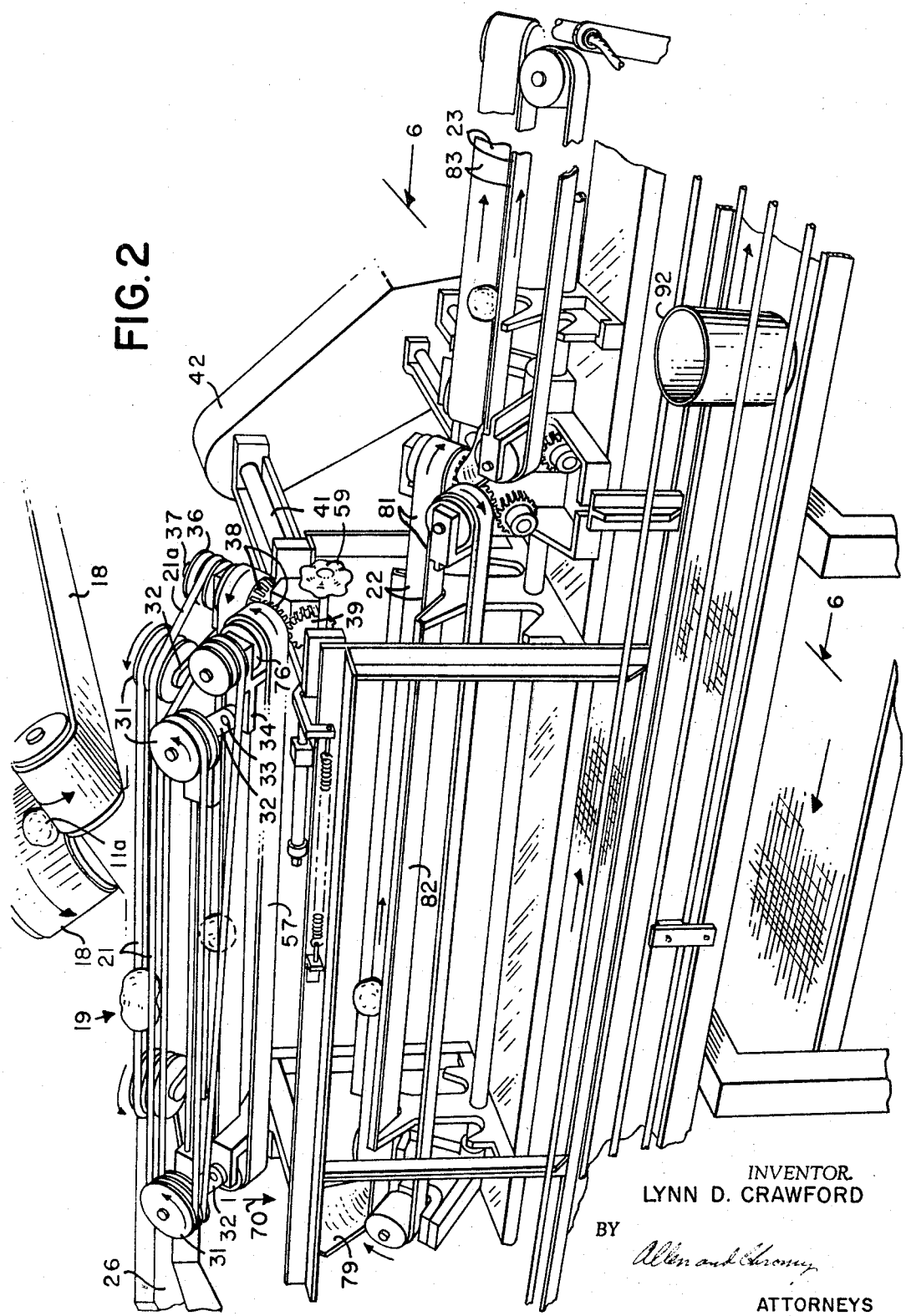

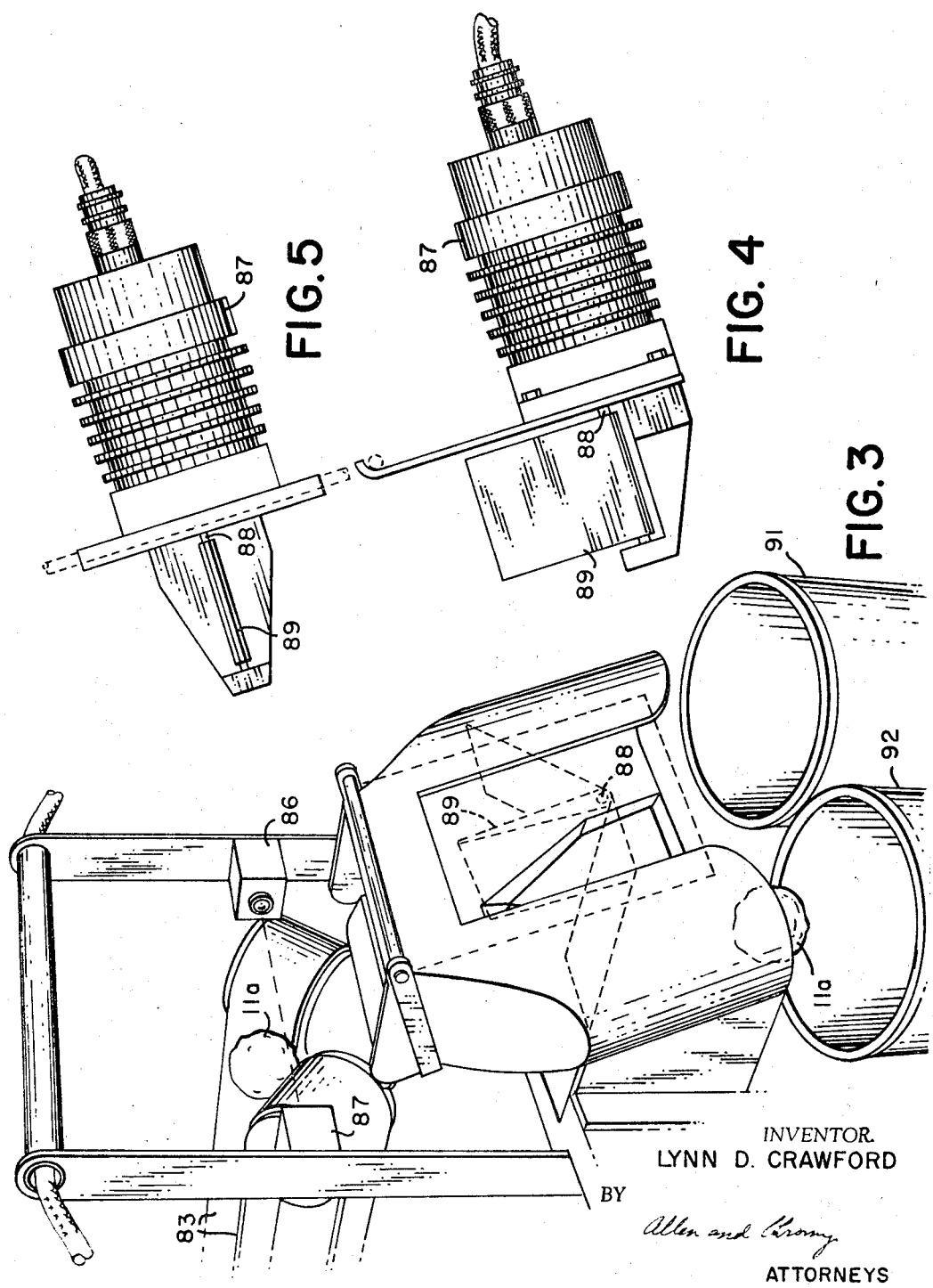

INVENTOR.
LYNN D. CRAWFORD

INVENTOR.
LYNN D. CRAWFORD 3,422,954
SORTING SYSTEM FOR FOOD ARTICLES
Lynn D. Crawford, San Jose, Calif., assignor of one-half to Genevieve I. Hanscom, Saratoga, Fla., and one-half to Genevieve I. Hanscom, Robert Magnuson, and Louis J. Duggan, as trustees of the estate of Roy M. Magnuson
Filed Feb. 11, 1966, Ser. No. 526,824
U.S. Cl. 209—102          7 Claims
Int. Cl. B07b 1/10

ABSTRACT OF THE DISCLOSURE

Sorting apparatus for sorting oversized articles such as meatball doubles from single meatballs for packing. The articles to be sized are dropped onto a trough-like conveyor with a sizing slot at the bottom, the walls of the trough being formed of stretched O-ring belts which vibrate to aid the sorting action. Oversized articles are discharged by the sorting conveyor while articles of the proper size pass through the sorting slot onto a section conveyor from which they are counted into cans. A "no can" condition effects closing of the sorting belts automatically for rejection of all articles.

---

The present invention relates to a sorting system for food articles and is concerned more particularly with a sorting system for food articles such as meatballs where articles of a proper size are selected and carried to a canning station and where articles of an improper size are rejected and returned to a source of supply for subsequent processing.

It is a general object of the invention to provide for sorting of food articles such as meatballs for size in a continuous fashion and to subsequently place the sized meat balls in cans.

A further object of the invention is to provide a sorting means including a pair of opposed sorting belts providing a sorting slot therebetween which can be varied in size to adjust to the proper sorting size, and which can be moved to an effectively closed position to reject all the articles when desired or necessary.

A further object of the invention is to provide a sorting means including a pair of parallel sorting belts providing a sorting opening therebetween said belts comprising a resilient element of a stretchable character and being normally in stretched condition when in operation to provide a vibrating action during sorting.

A further object of the invention is to provide for overriding of the normal control of the size of the opening and to effectively close the sorting opening so that all articles will be rejected.

A further object of the invention is to provide a sorting system in which the sorting of meatballs is accompanied by the placing of meatballs in a can and to provide a control in the absence of the can at the desired station to close the sorting system and to reject all the meatballs being fed thereto.

Still another object of the invention is to provide a sorting means including sorting means including vibratory sorting elements to enable easy passing of the articles to be sized where the articles are of sticky nature, for example, such as meatballs.

Other objects and advantages of the invention will be apparent from the following description thereof, taken in connection with the accompanying drawings, in which:

FIG. 2 is a perspective view of the sorting belt system of the invention;

FIG. 3 is a perspective view of the canning station where the meatballs are being fed by the conveying means and selected to be placed in either one of two cans at that station;

FIG. 4 is an elevational view of the rotary solenoid and gate used in the diverting operation in FIG. 3;

FIG. 5 is an elevational view of the rotary solenoid and gate as shown in FIG. 4, being taken at right angles thereto;

Figure 1:
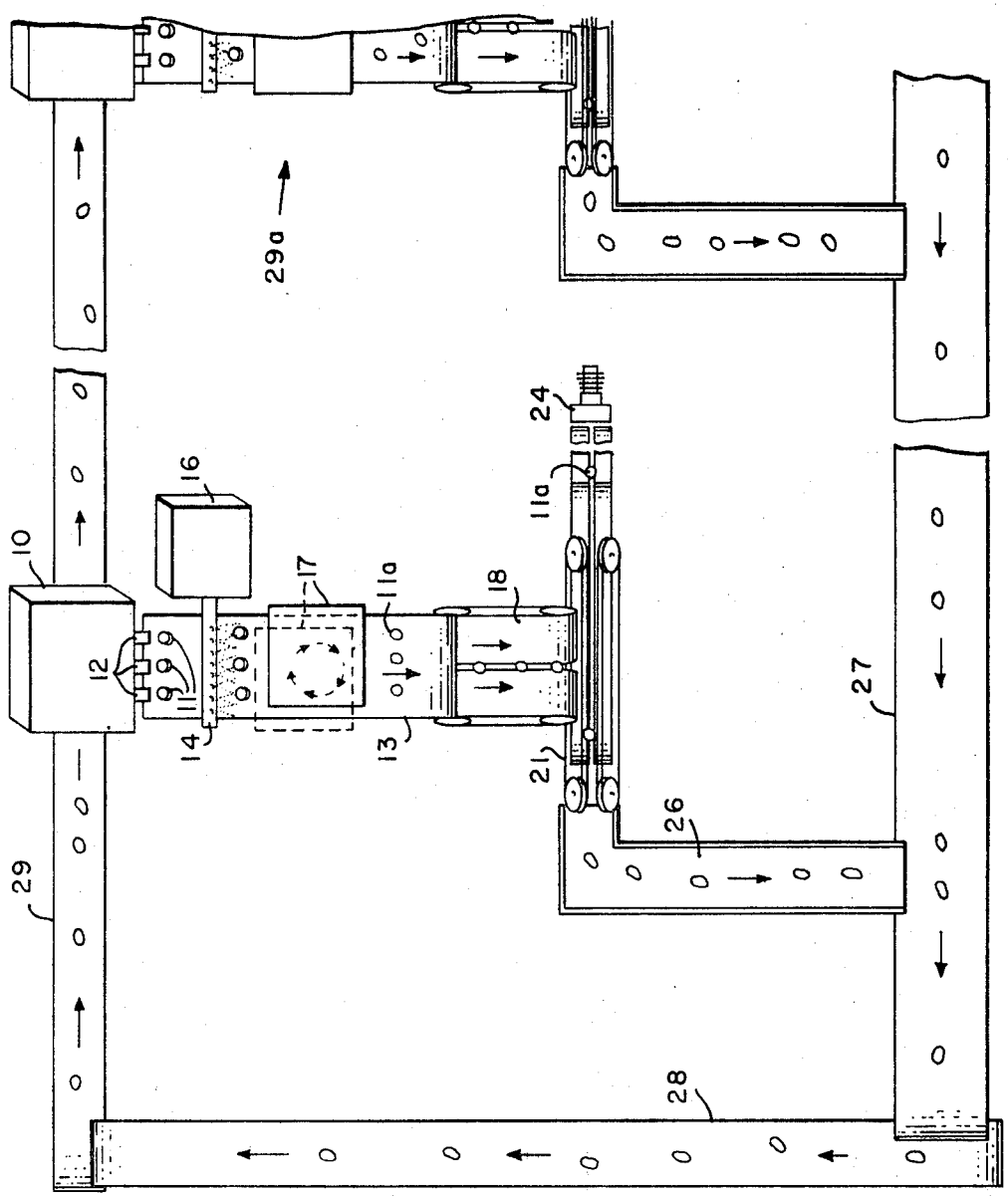
FIG. 1 is a schematic plan view of a system incorporating the invention.
Figure 6:
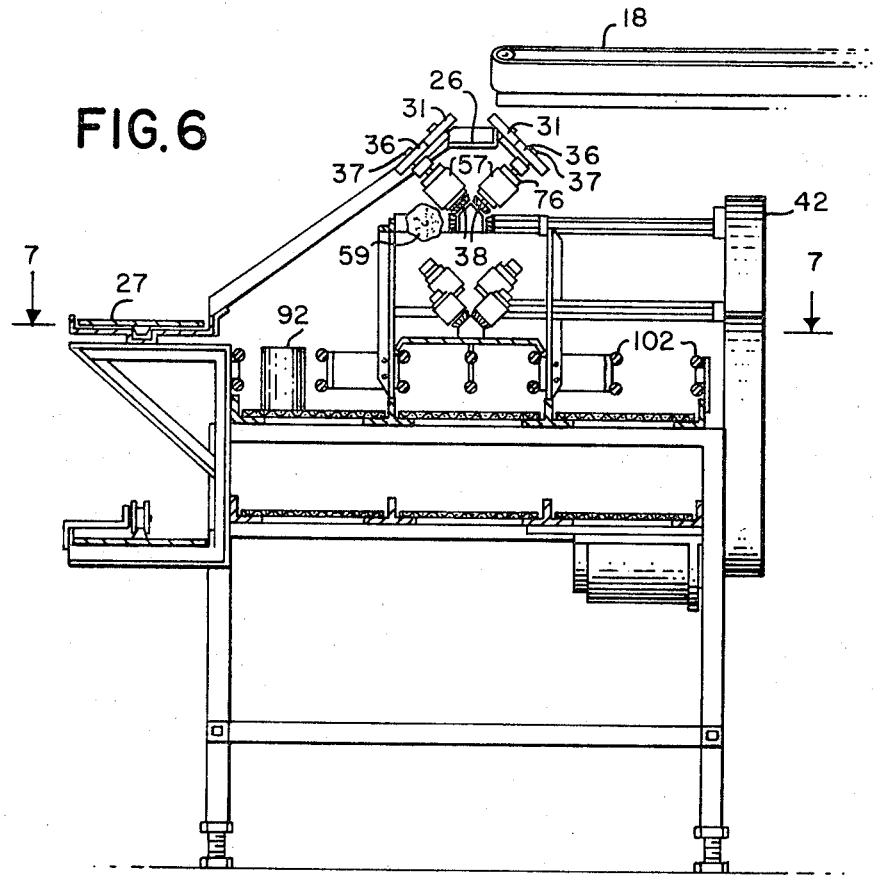
FIG. 6 is a transverse sectional elevational view taken at the plane indicated by the line 6—6 in FIG. 2.
Figure 7:
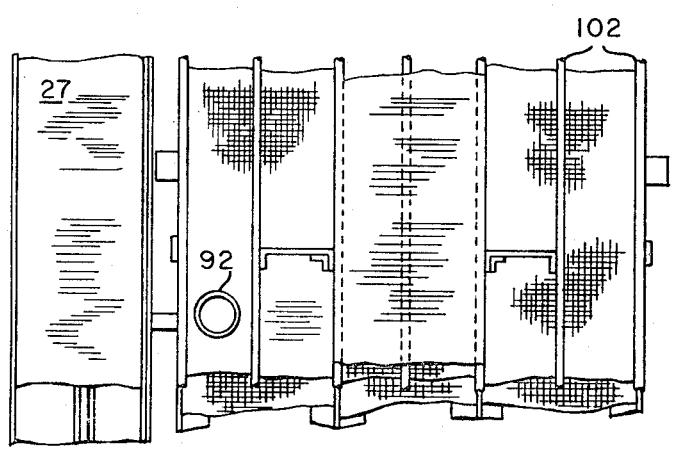
FIG. 7 is a fragmentary plan view of the conveyor system taken in the plane indicated by the line 7—7 in FIG. 6.

Referring first to FIG. 1 there is shown schematically a meatball processing and shorting system including a conventional source 10 of supply for ejecting meatballs 11 as cylindrical segments from a series of ejecting nozzles or tubes 12. The meatball segments are discharged onto a conveyor 13 and pass beneath a conventional flouring tube 14 in a suitable manner by a flour source 16. As the meatballs are traveling along, the conveyor 13 is subjected to the rotary action of an overhead conveyor 17 of conventional character so as to be changed from the cylindrical segments discharged from the nozzles 12 to substantially round meatballs as indicated at 11a. From the conveyor 13 the meatballs are discharged into a trough formed by a pair of parallel inclined conveyors 18 which singulate the meatballs and provide conveying means overlying a sorting station 19, at which respective pairs of sorting means or belts 21 are provided as will be described in greater detail hereinafter. The action of the sorting belts 21 being to pass the meatballs of a proper size through the slot between the sorting belts onto a pair of inclined conveyors 22, from which they are discharged onto a second pair of conveyors 23 operating at a faster linear rate of speed, and carried to a canning station 24 which we describe in greater detail hereinafter. The rejected meatballs which are of too large a size to pass between the belts 21 are carried by the belts and are discharged onto a return chute 26, and from this chute 26 onto a belt-type conveyor 27. The conveyor 27 is common to a series of these meatball sorting stations and discharges onto a conveyor 28 leading to a conveyor 29 which returns them to the source 10 of meatballs. A similar conveyor 29a is part of a return system for another one of the sorting means 19.

Figure 11:
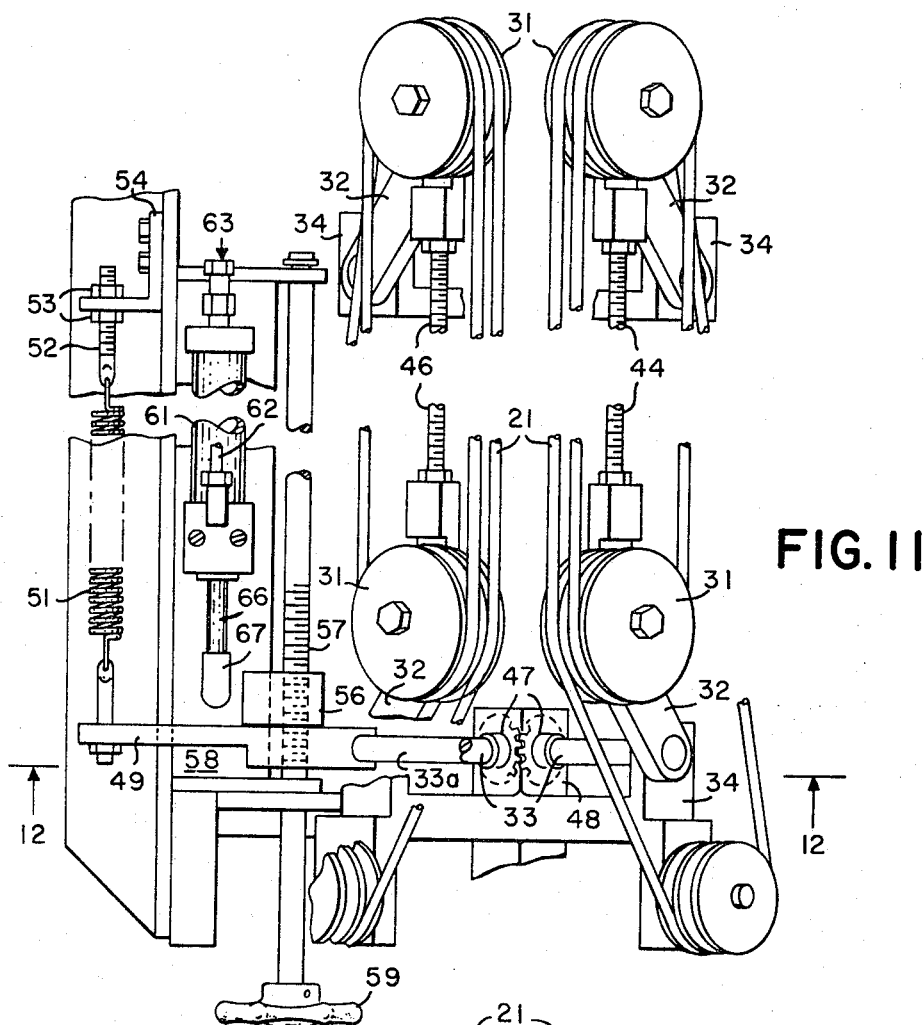
FIG. 11 is a plan view of one of the sorting station and shows a sorting belt and the controls therefor, being partially broken away to illustrate the details of construction.

Referring to FIGS. 2 and 11 it will be seen that each sorting belt 21 comprises a pair of resilient, stretchable O-rings trained about respective double grooved pulleys 31, each journaled on an arm 32 carried by a shaft 33 which is pivotally mounted on a frame part 34. Similarly, the opposite and parallel sorting means 21 comprises a pair of similar O-rings carried by double grooved pulleys 31 and by similar arms 32. One of the O-rings of each set of belts is extended at 21a and is carried around a pulley 36 on a a shaft 37 which at its lower end has a bevel gear 38 driven from a mating gear 39 carried by a shaft 41 extending into the drive housing 42. Also, the two bevel gears 38 mesh with each other.

Figure 12:
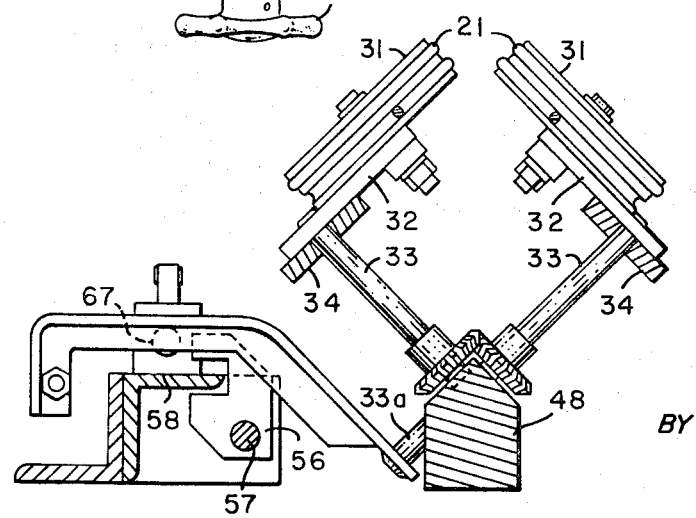
FIG. 12 is a transverse sectional view partially in elevation taken as indicated by the line 12—12 in FIG. 11.

Referring in particular to FIG. 11 it will be noted that the pulleys 31 are mounted about inclined axes which converge toward the bottom so that as the arms 32 are moved downwardly the spacing between the adjacent sorting belts 21 will increase and as the arms 32 move upwardly it will correspondingly decrease to where it is effectively closed. In order to assure simultaneous adjusting movement of the pulleys 31 and the belts 21, tiebars 46 are provided between the arms 32. To assure simultaneous movement of the various arms 32, the mounting shafts 33 for the rearward pair of arms as seen in FIGS. 11 and 12 are connected by meshing bevel gears 47 adjacent their point of journalling in a frame block 48. One shaft 33 is extended at 33a and carries a control member or arm 49 whose pivoting movement will control the spacing between the belts 21. At its outer end, the member 49 has connected thereto a tension spring 51 which is secured at its other end to an adjusting screw 52 secured by nuts 53 in a bracket 54 on the frame. The arm 49 is urged by the spring 51 against a stop 56 which has threaded engagement with an adjusting screw 57 and slidably engages a horizontal flange 58 of one of the frame angles. A hand wheel 59 is provided on the screw 57 for moving the stop 56 to the desired position to control the spacing between the belts.

Figure 13:
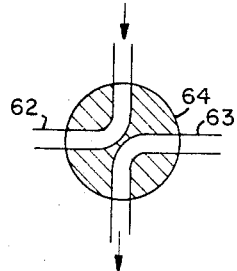
FIG. 13 is a schematic sectional plan view illustrating a conventional solenoid valve used to stop operation of the machine when insufficient cans are being fed to the machine for continued operation.

In order to control the sorting mechanism so as to optionally shut off the flow of meatballs into the mechanism and to reject all meatballs, an air cylinder 61 (FIGS. 2 and 11) is provided carried by the angle flange 58. The air cylinder 61 (FIGS. 2 and 11) has respective inlet and outlet conduits 62 and 63 leading therefrom to a suitable solenoid control valve 64 (FIG. 13). The cylinder 61 is provided with a piston rod 66 extending outwardly therefrom with a plastic or resilient nose 67 secured thereon in aligned relation with the control arm 49 for the spacing of a part of the belts 21. When the cylinder 61 is energized to extend the piston rod 66 and rock the arm 49 in a counterclockwise direction as viewed in FIG. 11, it will override the spring-maintained control setting of the member 49 against the stop 56 and move the belts 21 together so as to shut off any flow between the belts and cause all the meatballs to be carried by the belts and discharged onto the chute 26 and thence by the conveyor system back to the source of supply.

The solenoid control valve 64 (FIG. 13) is controlled by an electric switch 71 (FIG. 8) which is disposed in the path of the cans. As long as the cans are flowing in ample supply to take care of the meatballs the switch 71 will not be operated but when it is not operated by any can for a sufficient length of time, the solenoid valve 64 will be operated to cause the plunger 66 to move the control arm 49 in the manner described above.

Figure 9:
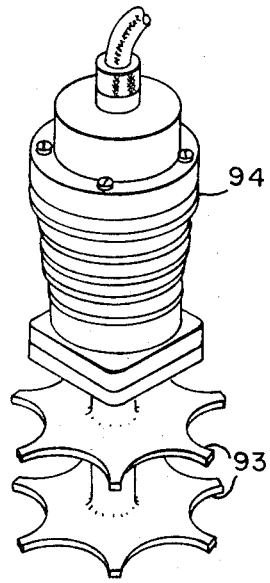
FIG. 9 is a perspective view of the can discharge means provided at each of the canning stations with respect to each line of cans to be filled.
Figure 8:
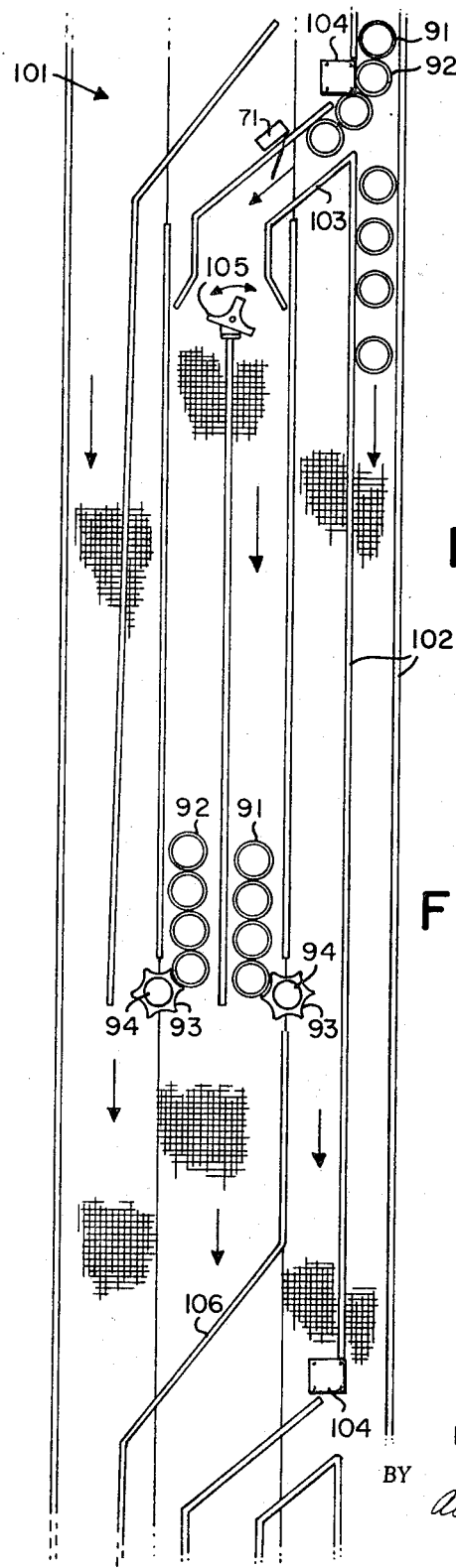
FIG. 8 is a schematic plan view illustrating the can flow in this system.
Figure 10:
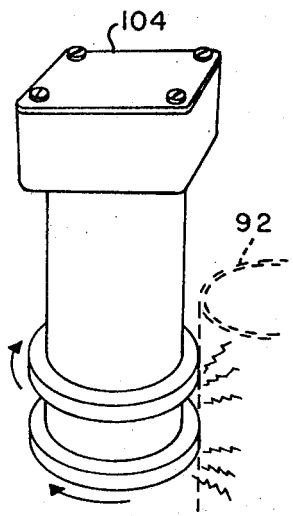
FIG. 10 is a perspective view of the can feed mechanism for diverting cans from the general supply to particular canning stations.

Referring again to FIG. 2 it will be noted that the shafts 37 also carry respective drums 76 for a pair of inclined conveyor belts 57 forming a trough to receive meatballs which pass through between the vibrating belts 21 and to cause these to be discharged at the left end as indicated by the arrow 70 downward onto a feed chute 79. The chute 79 leads to a pair of similarly inclined conveyor belts 81 which have back-up supports 82 and discharge onto a second pair of similar belts 83. The belts 83 are driven at a higher speed than the belts 81 so as to space the meatballs farther apart. At the discharge end of the belts 83 (see FIG. 3), there is provided a light source 86 and a photocell 87 which through suitable circuitry control a rotary solenoid mechanism including the housing 87 shown in FIGS. 4 and 5 and having a rotary output shaft 88 carrying a diverting gate 89. A suitable double rotary solenoid mechanism of this character is disclosed in copending application of Ralph K. Daugherty, Ser. No. 458,096 filed May 24, 1965, for Article Feeding Apparatus and Method, now abandoned, and having common ownership with this application. By virtue of the swinging of the gate 89 from its central dotted line position shown in FIG. 3 to either of its dotted line position the meatballs can be diverted in counted fashion to either one of cans 91 or 92 in accordance with the disclosure in the patent to Cowan No. 2,870,585. The cans 91 are controlled by sprocket wheels 93 (FIG. 9) of the type disclosed in the Cowan patent and controlled by an escapement mechanism 94 these two escapement sprockets being indicated schematically in FIG. 8. Referring to FIG. 8 there is shown wide conveyor 101 divided into various channels by the guide rails thereabove. The main feed for the cans 91 is provided between a pair of guide rails 102, and a diverting pair of guide rails 103 are located to define a feed path leading from the main feed line and the can feed to this feed path is controlled by means of a conventional magnetic drum takeoff mechanism 104 shown in perspective in FIG. 10. The cans diverted by the rails 103 are split into two sections by conventional pivoting divider 105, and then form the two lanes leading to the escapement starwheels 93 as previously described. The filled cans released by the escapements 93 are diverted by an inclined rail 106 for discharge.

While I have shown and described a preferred form of the invention, it will be apparent that the invention is capable of variation and modification from the form shown so that the scope thereof should be limited only by the proper scope of the claims appended thereto.

I claim:

1. In a sorting machine for rejecting oversized articles and for passing properly sized articles, a frame, sorting means comprising a pair of opposed parallel resilient belts providing a sorting opening therebetween, each said belt comprising a pair of stretched resilient O-rings which vibrate in response to impact of an article, said pairs of O-rings being disposed in V-shaped relation, means mounting said belts to control the spacing apart of said belts and thereby the size of the sorting opening, and means disposed above said belts to drop articles to said belts and said sorting opening whereby articles of a proper size pass through said opening and articles of a larger size are conveyed away by said belts for discharge.

2. In a sorting machine for rejecting oversized articles and for passing properly sized articles, a frame, sorting means comprising a pair of opposed parallel belts providing a sorting opening therebetween, each of said belts comprising resilient stretchable O-rings mounted in stretched condition, means mounting said belts to control the spacing apart of said belts and thereby the size of the sorting opening, and means disposed above said belts to drop articles to said belts and to said sorting opening whereby articles of a proper size pass through said opening and articles of a larger size are conveyed away by said belts for discharge.

3. In a sorting machine for rejecting articles over a given size and passing articles under a given size comprising a frame, a pair of sorting belts, a pair of support pulleys for each of said belts, a support arm on said frame for each pulley, the support arms for the pair of pulleys for one belt being disposed in parallel relation, and the respective arms for said pair of pulleys and the respective sets of pulleys being disposed in similar relation, means pivotally mounting said arms, means interconnecting said arms for simultaneous movement, and adjusting means for said arms including an operating member connected to said interconnecting means.

4. In a sorting machine for rejecting articles over a given size and passing articles under a given size comprising a frame, a pair of sorting belts, a pair of support pulleys for each of said belts, a support arm on said frame for each pulley, the support arms for the pair of pulleys for one belt being disposed in parallel relation, and the respective arms for said pair of pulleys and the respective sets of pulleys being disposed in similar relation, means pivotally mounting said arms, means interconnecting said arms for simultaneous movement, and adjusting means for said arms including an operating member connected to said interconnecting means, a spring for urging said operating member in a given direction, and an adjustable stop for said member to control the adjusted position thereof in response to movement of said member by said spring and thereby controlling the spacing-apart of said belts.

5. In a sorting machine as recited in claim 4, in which said belts serve to pass articles of a proper size and convey away and reject articles of a larger size, and means for overriding said spring and operating said member to move said belts to closed position to reject all of the articles.

6. In a sorting machine as recited in claim 4, in which said belts serve to pass articles of a proper size and convey away and reject articles of a larger size, and power operated means for overriding said spring and operating said member to move said belts to closed position to reject all of the articles, means for receiving sorted articles passing through said belts and for discharging them into a can, and a can-controlled element for operating said overriding means.

7. In a sorting machine for rejecting articles over a given size and passing articles under a given size comprising a frame, a pair of sorting belts, a pair of support pulleys for each of said belts, the support pulleys for each belt having included axes to provide a trough between said belts, a support arm on said frame for each pulley, the support arms for the pair of pulleys for one belt being disposed in parallel relation and the respective arms for said pair of pulleys and the respective sets of pulleys being disposed in similar relation, means pivotally mounting said arms, means interconnecting said arms in simultaneous movement, and adjusting means for said arms including an operating member connected to said interconnecting means, and a spring for urging said operating member in a direction to increase said sorting opening, and an adjustable stop for said member to control the adjusted position thereof in response to movement of said member by said spring and thereby controlling the spacing-apart of said belts.

References Cited

UNITED STATES PATENTS

| | | | |
|---|---|---|---|
| 2,180,559 | 11/1939 | Stebler | 209—102 |
| 2,292,068 | 8/1942 | Grayson | 209—102 X |
| 3,204,765 | 9/1965 | Adcox | 209—111.7 X |

M. HENSON WOOD, Jr., *Primary Examiner.*

R. A. SCHACHER, *Assistant Examiner.*